United States Patent [19]
Policappelli et al.

[11] Patent Number: 5,612,039
[45] Date of Patent: Mar. 18, 1997

[54] DIETARY SUPPLEMENT

[75] Inventors: Nini E. Policappelli, 361 N. Robertson Blvd., Los Angeles, Calif. 90048; Rafaele Garzone; Claudio Russo, both of Bari, Italy

[73] Assignee: Nini E. Policappelli, Los Angeles, Calif.

[21] Appl. No.: 426,677

[22] Filed: Apr. 21, 1995

Related U.S. Application Data

[63] Continuation-in-part of Ser. No. 212,246, Mar. 14, 1994, abandoned, and a continuation-in-part of Ser. No. 303,533, Sep. 9, 1994, abandoned, and a continuation-in-part of Ser. No. 344,180, Nov. 23, 1994, abandoned.

[51] Int. Cl.$^6$ .................................................. A61K 35/78
[52] U.S. Cl. ........................................................ 424/195.1
[58] Field of Search ............................................. 424/195.1

[56] References Cited

U.S. PATENT DOCUMENTS

| | | | |
|---|---|---|---|
| 3,764,694 | 10/1973 | Lowenstein | 514/422 |
| 3,919,254 | 11/1975 | Guthrie et al. | 549/318 |
| 4,379,173 | 4/1983 | Masuyama | 426/549 |
| 4,432,968 | 2/1984 | Page et al. | 424/497 |
| 4,761,286 | 8/1988 | Hiji | 424/195.1 |
| 4,897,266 | 1/1990 | Herve et al. | 424/195.1 |
| 5,085,883 | 2/1992 | Garleb et al. | 426/590 |
| 5,116,820 | 5/1992 | Hiji | 514/25 |
| 5,273,747 | 12/1993 | Bombardelli et al. | 424/195.1 |
| 5,324,526 | 6/1994 | Iwata et al. | 426/2 |
| 5,389,395 | 2/1995 | Joseph et al. | 426/72 |

OTHER PUBLICATIONS

J. Carper, The Food Pharmacy, Dramatic New Evidence That Food is Your Best Medicine, Bantam Books, pp. 114–215.

R. Passwater, Chromium Picolinate, A Good Health Guide, 1992, Keats Pub. pp. 13–20.

*Primary Examiner*—John W. Rollins
*Attorney, Agent, or Firm*—Merchant, Gould, Smith, Edell, Welter & Schmidt

[57] ABSTRACT

A composition for dietary supplementation includes the following three compositions: The first composition is Germander (Teucrium Chamaedrys Herba), Camelia Tea (Camelia Thea Folia), and Spirulina (Spirulina Maxima); the second composition is Garcinia Gambogia, dry extract (Garcinia Cambogia Fructuse), Brown Algae, dry extract (Fucus Vesicolosus), and Germander (Teucrium Chamaedrys Herba); the third composition is Garcinia Gambogia, dry extract (Garcinia Cambogia Fructuse), Brown Algae, dry extract (Fucus Vesicolosus), and Orthosiphon, dry extract (Orthosiphon Stamineus Folia), respectively. Additionally, there is a fourth composition including Common Bean (Phaseolus Vulgaris Fructus), Garcinia Cambogia, dry extract (Garcinia Cambogia Fructus), Pineapple, dry extract (Ananas Sativus Stipites), Gymnema Sylvestre, dry extract (Gymnema Sylvestre Folia), and Chromium Dinicotinate (Chromium).

11 Claims, No Drawings

DIETARY SUPPLEMENT

This application is a continuation-in-part of U.S. patent application Ser. Nos. 08/212,246, filed Mar. 14, 1994, abandoned; 08/303,533, filed Sep. 9, 1994, abandoned; and 08/344,180, filed Nov. 23, 1994, abandoned. The contents thereof are incorporated by reference herein.

BACKGROUND

Today, obesity is one of the most prevalent problems associated with nutrition. In the United States, 20–30% of adults suffer from obesity. Although there are many factors which attribute to the problem, it is characterized by the deposit of fat cells and influenced by caloric intake, metabolism and genetic predisposition.

This invention is directed to a chemical composition being a dietary supplement. The invention is also described as method of weight loss using this supplement.

The invention is particularly concerned with reducing the build-up of body fat of any living being. In particular, the invention is concerned with treating individuals with "normal" obesity, rather than obesity associated with medical problems of the endocrine or neuroendocrine system. Such individuals require medical assistance to control the condition of obesity. In normal obesity, weight can be reduced by reduction of caloric intake and the increased energetic consumption.

Scientific experiments reveal that the appetite is controlled by two different nerve centers of the hypothalamus known as "the center of appetite" and the "center of satiety".

Once food has been ingested, it goes through a biological process and series of modifications before it is assimilated to an intestinal level. Digestion becomes effective due to the preparation activity of enzymes that function to degrade the food from complex molecules. Therefore, through the assimilation process, the molecules can cross the intestinal membrane into the blood system.

The first stage of digestion occurs in the mouth through the chewing mechanism of the food. Saliva, which is produced in the chewing of the food, also contains an enzyme, namely, salivary alpha-amylase. This enzyme provides the first transformation and the partial decomposition of the cooked starches.

Present in the gastric level, in addition to hydrochloric acid which provides further degradation of the cooking starches, is a proteolytic enzyme called pepsin which functions to effect break-up of the proteins.

At the intestinal level, the first stage of digestion takes place in the duodenum. There is a break-up of the food by the enzymes of the pancreas and of the bile. The pancreas has three different types of enzymes: lipase, which provides for the break-up of the fats; trypsin, which provides for the break-up of proteins; and alpha-amylase, which provides for a break-up of starches initiated from the saliva.

The absorption of the food products and the enzymatic break-up of the food occurs at the intestinal level.

In the duodenum and in the first phase of fasting, the absorption of "amino-acids" occurs. This is the resultant product from the break-up of the protein. Also, there is the "monosaccharides", namely, the product of the break-up of the starches.

The methods commonly used for dietary control are:
1) an appropriate well-balanced diet that reduces daily calories and includes management of fat, carbohydrate and protein intake;
2) the use of an amphetamine-like agent which reacts on the hypothalamic center to reduce the sensation of hunger; and
3) the implementation of a physical activity/exercise program.

However, experience also indicates the following:
1) The majority of individuals abandon their diet regime before they reach their goal or ideal weight because of a variety of reasons which include emotional pressure, discouragement or chronic feelings of hunger. These individuals lose sight of their objective and this is one reason why education is a fundamental aspect in order to modify behavior which leads to obesity.
2) In respect to people affected by anorexia, the collateral consequences written in scientific papers indicates that the possibility exists to generate a return to worse conditions. These individuals can have an uncontrollable and unbalanced sign of appetite as soon as they stop their medical and pharmaceutical cure.
3) Physical activity via exercise (jogging, aerobics, etc.), if not practiced daily and spontaneously with a sense of pleasure and stimulation, will be disregarded and therefore fail to progress and effect weight control.

Many different formulations and compositions are known for dietary control to achieve a reduction in calories and management of intake. These known compositions suffer disadvantages and do not operate effectively.

There is a need to provide for an improved dietary control and a need for improved dietary compositions.

SUMMARY

By this invention there is provided a dietary composition and method of dietary control which minimizes the disadvantages of known compositions and methods.

According to the invention, there is provided a dietary composition including the basic ingredients of at least bean protein (Phasoleus Vulgaris), guggul (Commiphora Mukul) and java tea (Orthosifono the di Giava/Ortosiphon stamineus).

In addition to the above basic ingredients, there are selectively the ingredients of camellia tea (Verde or Vergine/Camellia Thea), germander (Camedrio/Teucrium Chamedrys l.), galactomannan or glucomannan, grapefruit pectin (Pectina di Pompelmo), brown algae (Fucus Vescicolosus), and 10% grapefruit pectin (Pectina al).

The ingredients are preferably formulated as a capsule and are taken at least three times a day before meals.

The composition containing the ingredients of germander (Camedrio/Teucrium Chamedrys l.), bean protein (Phasoleus Vulgaris), Guggul (Commiphora Mukul), the camellia tea (Verde or Vergine/Camellia Thea) and germander (Camedrio/Teucrium Chamedrys l.) is taken before breakfast.

The composition with the ingredients bean protein (Phasoleus Vulgaris), guggul (Commiphora Mukul), java tea (Orthosifono the di Giava/Ortosiphon stamineus), galactomannan or glucomannan, and grapefruit pectin (Pectina di Pompelmo) is taken before lunch.

The composition with the ingredients bean protein (Phasoleus Vulgaris), guggul (Commiphora Mukul), java tea (Orthosifono the di Giava/Ortosiphon stamineus), brown algae (Fucus Vescicolosus), and 10% grapefruit pectin (Pectina al) is taken before dinner.

Different formulations are possible for maintaining a weight condition and for losing weight. For losing weight, the formulation can include Gamboge (Garcinia hanburi; Guttiferae), dried algae extract (fucus estratto secco—alga bruna), and java tea (Orthosifono the di Giava) as a composition to be ingested before lunch and dinner.

The invention is further directed to having the Gamboge (Garcinia hanburi; Guttiferae), with a hydroxycitric acid content at a concentration level greater than about 550 milligrams/per gram. Preferably, the hydroxycitric acid content is between about 550 and 700 milligrams/per gram. The Garcinia Cambogia with the hydroxycitric acid extract of this content is achieved by treating the Garcinia Cambogia with hot water under pressure. With Garcinia Cambogia having this content, there is greater ability to reduce appetite and assist in function of dietary control.

In a preferred form of the invention, the dietary formulation for the various meals includes at least three different compositions, as follows:

Breakfast

Germander (*Teucrium Chamaedrys Herba*)
Camelia Tea (*Camelia Thea Folia*)
Spirulina (*Spirulina Maxima*)

Lunch

Garcinia Gambogia, dry extract (*Garcinia Cambogia Fructuse*)
Brown Algae, dry extract (*Fucus Vesicolosus*)
Germander (*Teucrium Chamaedrys Herba*)

Dinner

Garcinia Gambogia, dry extract (*Garcinia Cambogia Fructuse*)
Brown Algae, dry extract (*Fucus Vesicolosus*)
Orthosiphon, dry extract (*Orthosiphon Stamineus Folia*)

In the preferred procedure for dietary control, the first composition is taken before breakfast, the second composition before lunch and the third composition before dinner.

Additionally, there is a fourth composition for lunch and dinner. This has the formulation Common Bean (Phaseolus Vulgaris Fructus), Garcinia Cambogia, dry extract (Garcinia Cambogia Fructus), Pineapple, dry extract (Ananas Sativus Stipites), Gymnema Sylvestre, dry extract (Gymnema Sylvestre Folia), and Chromium Dinicotinate (Chromium).

The invention is directed to the chemical compositions, the composition for dietary control and also the method of controlling diet using these compositions. Such compositions can be used for weight loss, weight control and reduction of fats in the bodily organs.

The invention is further described with reference to the accompanying description.

DESCRIPTION

The composition and method for dietary control and weight loss are premised on the principles of:

1) retaining individual's food habits without having to alter any type of diet;
2) diminishing mechanically the sense of hunger without indulging in any type of pharmaceutical equivalent of amphetamines. The composition and method should improve the intestinal peristalsis and retrain the stomach to receive physiologically a less quantity of food, and to adduce a sign of satiety without being impatient for food; and
3) avoiding the obligation of physical activity.

The invented composition, substances and capsules are natural. The metabolism is activated and the combustion of fat cells in the cell adipose is stimulated.

The invented composition and method is directed to hunger reduction, burning fat, and activating the metabolism.

The formulation does not corrode the natural function of the organism and permits the subject to maintain regular alimentary habits without physical force.

The various ingredients of the composition have the following properties:

GLUCOMANNAN, GALACTOMANNAN

Ingesting the glucomannan or galactomannan provides the capacity of absorbing a high quantity of liquid. The value of liquid absorption will increase 100 times the original liquid absorption. In its own form at the gastric level, the galactomannan or glucomannan becomes a natural vegetable gel. This helps to diminish the sense of hunger in a natural way giving the sense of satiety.

In addition, the glucomannan or galactomannan, which is a polysaccharide does not assimilate from the organism. There is no additional calories because of this.

The glucomannan or galactomannan does not inhibit the processing of food, and food component break-up and assimilation. During the intestinal process, in addition to absorbing a great quantity of water and liquid, absorption of the molecular nutritional base: protein, namely the action of trypsin; glycerides, namely the action of lipase and lipide; glycide, namely the action of alfa-amylase, is affected. This has the enterical ability to, in effect, partially kidnap the bile. This translates into a noticeable drop of the absorption of the cholesterol by the body.

The absorption of glucose through the action of alfa-amylase of the pancreas is, in addition, essentially paralyzed by the presence of the natural product, usually a bean protein. This ingredient has the ability to block the enzyme through the digestion of starch. About 500 mg of bean protein is sufficient to block the digestion of starch. This quantity of bean protein corresponds to 400 calories.

Laboratory tests have demonstrated that bean protein eliminates the increase of glucose in the serum. Consequently, a plentiful meal of a farinaceous ingredient results in the majority of the starch being eliminated through the feces. The inhibition of the starches is therefore effected.

In the final phase of the intestinal tract, all fats are absorbed. The glucomannan or the galactomannan at the ileum internally mixes with water and has the tendency to accumulate the food wastes which are not digested. The cholesterol and fats are digested.

Ultimately, the expansion and growth of the volume as it proceeds intestinally to the large intestine collects fats. Intestinal flora bacteria which is provoked by the intestinal peristalsis is absorbed. This leads to evacuation and elimination of all food wastes through the feces.

BROWN ALGAE (FUCUS SP.)

The action of brown algae has a triple effect:

1) Hunger reduction

Brown algae contains mucilage that, once in contact with water, inflates in the stomach without being assimilated. This liquidizes the absorption of the food and collects the fats through the intestinal cycle and assists the elimination of food wastes.

2) Remineralizinq Action

There is the property found through the concentration of sea water which is rich in vitamins (A-B-C-E), amino-acids, oligoelements, iodine (1–1.7% of ashes), bromo, mineral salts (potassium) in measurement of 20–30% of the ashes, mannite (2.3–2.7%), essential oil and sour substances.

3) Action on the General Metabolism

There is the aggressive activation of the exchange of the osmosis and stimulation with the endocrine glands. This favors the general action of metabolism. The glucomannan or galactomannan effect is described above. Brown algae acts similarly.

A beneficial effect is obtained in adding the bean extract because of the same peculiar properties which have been described.

VIRGIN TEA—GERMANDER (CAMEDRIO)

The Virgin Tea component eats "out" the fats. The principle properties and action is to stimulate the activity of the adrenalin on the adipose tissue. Furthermore, this ingredient complicates the digestion of the enzyme which slows down the assimilation of sugar and fats.

The germander (Camedrio) component is an additional herbal ingredient utilized to consume fats. This herb is rich in tannin and flavonoid. This limits the assimilation of fats and sugar functioning on the digestive enzyme.

Diuretic and hepatostimulant, also contains marubina and carbolic acid (caffeine, glorogenina), which stimulate the combustion of the reserve fats which are deposited adipose cells.

The activity of lipolysis (lipolica) is at a general level (adipose) similar to virgin tea.

Besides having a low caffeine content (5 g of tea is equivalent to 15 g of coffee), through the component of the tannin which is known to be rich, the formulation does not cause feelings of hyperactivity.

The virgin tea and the germander (camedrio) in the composition because clinical studies reported from the Journal de Medicine Pratique (1989-3,25-12-14), revealed that patients treated for 45 days with the virgin tea and germander (camedrio), noted a weight reduction of approximately 4.7 Kg., equivalent to approximately 9.5 pounds.

The same results are obtained on those patients treated with dexfenfluorenina, and with the advantage found in individuals treated with phytotherapic products, and with the absence of collateral effects, namely, high blood pressure, cephalogy, insomnia and nausea related to the medication.

SPIRULINA (Spirulina maximima, S.platensis-family oscillstoriace)

This is a vitamin obtained from seaweed. Using an extract of this element, as a natural product, acts to assist in reduction of fat. This product does not create any cholesterol. This product is characterized by G. Schelef, Carl J. Soeder, Algae biomass product and use Elsevier '80.

The product can be ingested in a range from about 100–200 mg to about 7–8 g per day, based on a person's metabolism.

GAMBOGE (Garcinia hanburi; Guttiferae)

This is a spicy, hot herb that affects the stomach and colon. The hardened resin is used and the active constituents are resin, gum, garonolic acids, and vegetable matter. The gum is similar to gum acacia.

Calcium salt of Garcinia Cambogia-hydroxycitric acid extract is used for the dietary supplement purposes.

Approximately 550 to 700 mg of hydroxycitrate per gram of material (~50% (–)HCA) is used. The product can be characterized with the following specifications:

| | |
|---|---|
| Chemical Classification | Organic, Nutrative |
| Physical Classification | Powder, Non-Fibrous |
| Color | Light Tan |
| Odor | Characteristic Smoky-Herbal |
| Taste | Characteristic Salty-Herbal |
| Loss on Drying | No more than 8.0% |
| Solubility (In warm water) | Not less than 70% |
| Clarity (Upon dissolution at 10 mg/cc $H_2O$) | Clear with residue |
| Ph (1% solution) | 6.0–8.0 |
| Organic Acid Content (mg/gm) | 550 ± 50 |
| (–)Hydroxycitric Acid Content (mg/gm) | 550 ± 700 |
| Calcium Content (mg/gm) | 120 ± 30 |
| Heavy Metals: | |
| Pb (ppm) | Less than 10 |
| Particle Size: | |
| Wt % Retained on U.S. #20 | NMT 5% |
| Wt % Retained on U.S. #100 | NLT 25% |
| Microbiological Assays: | |
| Total Plate Count (CFU/g) | Less than 10,000 |
| E. Coli(CFU/g) | Less than 10 |
| Salmonella (CFU/g) | Negative |

This cathartic is used for reducing dropsical conditions and for lowering blood pressure when there is danger of cerebral congestion. Combined in small amounts with other purgatives, it increases their effectiveness.

EXAMPLE 1

The composition should be used in conjunction with an appropriate food reduction and exercise program. The suggested intake should be taken 1 hour before meals with a minimum of 16 ounces of water based on the weight information below, until desired weight loss is reached:

From about 110 to about 165 lbs.—3 capsules per meal 3 times per day

From about 166 to about 215 lbs.—4 capsules per meal 3 times per day

From about 216 to about 300 lbs.—5 capsules per meal 3 times per day

The capsules designated for breakfast should be consumed before breakfast. The capsules designated for lunch should be consumed before lunch. The capsules designated for dinner should be consumed before dinner.

The respective formulations are:

BREAKFAST

Verde or Vergine (camellia tea)
Camedrio (germander)
Fagiolo Proteine (bean protein)
Gugul (guggul)
Orthosifono the di Giava (java tea)
Spirulina (seaweed)

LUNCH

Galattomannano/Glucomannano (galactomannan/glucomannan)
Pectina di Pompelmo (10% grapefruit pectin)
Fagiolo proteine (bean protein)
Orthosifono the di Giava (java tea)
Gugul (guggul)

Spirulina (seaweed)
DINNER

Alga bruna (brown algae)
Pectina al (10% grapefruit pectin)
Fagiolo Proteine (bean protein)
Orthosifono the di Giava (java tea)
Gugul (guggul)
Spirulina (seaweed)

The different formulations have the desired concentrations in the following general range:

|  | Preferred Milligram Content of each Capsule |
|---|---|
| Breakfast | |
| Verde or Vergine (camellia tea) | about 80 to about 220 |
| Camedrio (germander) | about 80 to about 220 |
| Fagiolo Proteine (bean protein) | about 60 to about 200 |
| Gugul (guggul) | about 30 to about 100 |
| Orthosifono the di Giava (java tea) | about 50 to about 150 |
| Spirulina | about 60 to about 190 |
| The preferred quantity of each component is about the center of each range. | |
| Lunch | |
| Galactomannan/Glucomannan | about 200 to about 650 |
| Pectina di Pompelmo (10% grapefruit pectin concentrate) | about 5 to about 15% |
| Fagiolo proteine (bean protein) | about 50 to about 200 |
| Orthosifono the di Giava (java tea) | about 50 to about 150 |
| Gugul (guggul) | about 60 to about 190 |
| Spirulina (seaweed) | about 30 to about 100 |
| The preferred quantity of each component is about the center of each range. | |
| Dinner | |
| Alga bruna (brown algae) | about 200 to about 650 |
| Pectina al (10% grapefruit pectin concentrate) | about 5 to about 15% |
| Fagiolo Proteine (bean protein) | about 60 to about 200 |
| Orthosifono the di Giava (java tea) | about 30 to about 150 |
| Gugul (guggul) | about 30 to about 100 |
| Spirulina (seaweed) | about 30 to about 100 |
| The preferred quantity of each component is about the center of each range. | |

A different formulation for maintenance of weight has the following desired concentrations in the following general range:

|  | Preferred Milligram Content of each Capsule |
|---|---|
| Breakfast | |
| Verde or Vergine (camellia tea) | about 100 to about 280 |
| Camedrio (germander) | about 80 to about 280 |
| Spirulina (seaweed) | about 90 to about 200 |
| The preferred size of this overall capsule is 600–750 mg. The preferred quantity of each component is about the center of each range. | |
| Lunch | |
| Galactomannan/Glucomannan | about 200 to about 500 |
| Fagiolo proteine (bean protein) | about 90 to about 180 |
| Orthosifono the di Giava (java tea) | about 60 to about 160 |
| Guggul estratto (gugul extract) | about 20 to about 80 |
| Pectina al (pectin) | about 80 to about 110 |
| The preferred size of this overall capsule is 750–850 mg. The preferred quantity of each component is about the center of each range. | |

|  | Preferred Milligram Content of each Capsule |
|---|---|
| Dinner | |
| Gamboge (garcinia gamboge; gummi gutta) | about 120 to about 280 |
| Alga bruna (brown algae) | about 110 to about 280 |
| Faglio proteine (bean protein) | about 80 to about 180 |
| Orthosifono the di Giava (java tea) | about 40 to about 160 |
| The preferred size of this overall capsule is 750–850 mg. The preferred quantity of each component is about the center of each range. | |

|  | Preferred Milligram Content of each Capsule |
|---|---|
| Lunch | |
| Verde or vergine (camellia tea) | about 120 to about 280 |
| Camedrio (germander) | about 90 to about 280 |
| Spirulina (seaweed) or | about 90 to about 280 |
| Garcinia gamboge gummi gutta | about 300 to about 600 |
| The preferred size of this overall capsule is 600–750 mg. The preferred quantity of each component is about the center of each range. | |
| Dinner | |
| Gamboge (garcinia gamboge; gummi gutta) | about 300 to about 600 |
| Alga bruna (brown algae) | about 60 to about 200 |
| Orthosifono the di Giava (java tea) | about 100 to about 280 |
| The preferred size of this overall capsule is 750–850 mg. The preferred quantity of each component is about the center of each range. | |

The preferred size of this overall capsule is 750–850 mg. The preferred quantity of each component is about the center of each range.

| Alternative Lunch and Dinner Formula: | |
|---|---|
| Lunch | |
| Galactomannan/Glucomannan | about 120 to about 280 |
| Fucus Estratto secco (dried algae extract) | about 60 to about 200 |
| Orthosifono the di Giava (java tea) | about 100 to about 280 |
| The preferred size of this overall capsule is 750–850 mg. The preferred quantity of each component is about the center of each range. | |
| Dinner | |
| Galactomannan/Glucomannan | about 120 to about 280 |
| Fucus estratto secco (dried algae extract) | about 60 to about 200 |
| Orthosifono the di Giava (java tea) | about 100 to about 280 |
| The preferred size of this overall capsule is 750–850 mg. The preferred quantity of each component is about the center of each range. | |

EXAMPLE 2

In a different form of the invention, in addition to the above-mentioned compositions for dietary control, an additional composition can be provided which is in the form of an integrator. The contents of the integrator are:

| Phaseolus-Vulgaris | 140–550 mg |
|---|---|
| Garcinia Cambogia | 50–250 mg |
| Ananas-Sativus | 75–175 mg |
| Chromium | .001 mg–.015 mg |

| Gimnema - Silvestre | 50–130 mg |

The Chromium is a metal mineral.

In yet a different form of the integrator, there is an overall reduction of about 20% of each of the above integrator constituents. Spiruline is then added to the integrator composition to replace the 20% reduction of the other constituents.

Where the integrator is used, there are four pills taken at each of the meals. In different situations where 3, 4, or 5 pills are taken for lunch or dinner, two integrator pills are taken.

The contents of the integrator pills will vary between 850 mg to 1.2 g. The preferred quantity of each component is about the center of each range, and the preferred size of the integrator is in the center of its range.

EXAMPLE 3

The preferred dietary procedure is as follows:

Before breakfast a composition with the following formula:

Germander (Teucrium Chamaedrys Herba)
Camelia Tea (Camelia Thea Folia)
Spirulina (Spirulina Maxima)
This is contained in a 600 mg capsule.
Before lunch, a composition with the following formula:

Garcinia Gambogia, dry extract (Garcinia Cambogia Fructuse)
Brown Algae, dry extract (Fucus Vesicolosus)
Germander (Teucrium Chamaedrys Herba)
This is contained in a 750 mg capsule.
Before dinner, a composition with the following formula:

Garcinia Gambogia, dry extract (Garcinia Cambogia Fructuse)
Brown Algae, dry extract (Fucus Vesicolosus)
Orthosiphon, dry extract (Orthosiphon Stamineus Folia)
This is contained in a 750 mg capsule.
Additionally, before lunch and dinner the following composition should be taken:

Common Bean (Phaseolus Vulgaris Fructus)
Garcinia Cambogia, dry extract (Garcinia Cambogia Fructus)
Pineapple, dry extract (Ananas Sativus Stipites)
Gymnema Sylvestre, dry extract (Gymnema Sylvestre Folia)
Chromium Dinicotinate (Chromium).
This is contained in a 850 mg capsule.

General

The product provides for weight loss and the maintenance of a desired weight. This may be obtained without physical and psychological sacrifices.

The product can also control and reduce fats in different organs of the body. These organs would be the liver, heart, intestines, veins and also the blood. The product can assist in reducing blood pressure and in decreasing cholestrol levels.

The composition includes the basic ingredients of bean protein (Phasoleus Vulgaris), guggul (Commiphora Mukul), and java tea (Orthosifono the di Giava/Ortosiphon stamineus). Additionally, there are the ingredients of the camellia tea (Verde or Vergine/Camellia Thea), germander (Camedrio/Teucrium Chamedrys l.), galactomannan or glucomannan, grapefruit pectin (Pectina di Pompelmo), brown algae (Fucus Vescicolosus), and 10% concentrate grapefruit pectin (Pectina al).

The product and formula can be produced in the form of gelatin capsules, pills, resins or any other compressed material. The product can be produced as a powder, liquid, syrup and any other available substance to produce finished food product.

Many other examples of the invention exist each differing from the others and that is a detail only. For instance, in some situations it is possible to replace the grapefruit juice with apple juice.

Although the invention has been described with respect to dietary control for humans, the composition has application for other living beings, such as many animals, thus, dietary control for canine, bovine, feline and equine beings. When used for animals, the quantity of the composition will vary according to the different metabolisms of the animal.

The composition of the invention can be provided as other food or as part of other food. Thus, the composition can be in the form of a biscuit or be an ingredient in a beverage, pasta, cake or other suitable solid, liquid or powder carrier for the composition.

The invention is to be determined solely in terms of the following claims.

What is claimed is:

1. A dietary formulation comprising at least three compositions, the first composition including Teucrium Chamaedrys Herba, Camelia Thea Folia, and Spirulina Maxima; the second composition including dry extract of Garcinia Cambogia Fructuse, dry extract of Fucus Vesicolosus, and Teucrium Chamaedrys Herba; and the third composition including dry extract of Garcinia Cambogia Fructuse, dry extract of Fucus Vesicolosus, and dry extract of Orthosiphon Stamineus Folia.

2. A dietary formulation comprising at least four compositions, the first composition including Teucrium Chamaedrys Herba, Camelia Thea Folia, and Spirulina Maxima; the second composition including dry extract of Garcinia Cambogia Fructuse, dry extract of Fucus Vesicolosus, and Teucrium Chamaedrys Herba; the third composition including dry extract of Garcinia Cambogia Fructuse, dry extract of Fucus Vesicolosus, and dry extract of Orthosiphon Stamineus Folia; and the fourth composition including Phaseolus Vulgaris Fructus, dry extract of Garcinia Cambogia Fructus, dry extract of Ananas Sativus Stipites, dry extract of Gymnema Sylvestre Folia, and Chromium Dinicotinate.

3. A method of dieting in a human including ingesting about 750 mg of the first composition of claim 1 before a breakfast meal.

4. A method of dieting in a human including ingesting about 750 mg of the second composition of claim 1 before a lunch meal.

5. A method of dieting in a human including ingesting 750 mg of the third composition of claim 1 before a dinner meal.

6. A method of dieting in a human including ingesting 750 mg of the fourth composition of claim 2 before a lunch meal.

7. A method of dieting in a human including ingesting 750 mg of the fourth composition of claim 2 before a dinner meal.

8. A method of dieting in a human including ingesting ingesting the dietary formulation of claim 2 by ingesting 750 mg of the first composition before a breakfast meal, 750 mg of the second composition before a lunch meal, 750 mg of the third composition before a dinner meal, and 750 mg of the fourth composition before a lunch meal.

9. A method of dieting in a human including ingesting the dietary formulation of claim 2 by ingesting 750 mg of the first composition before a breakfast meal, 750 mg of the second composition before a lunch meal, 750 mg of the third composition before a dinner meal, 750 mg of the fourth composition before a lunch meal and before a dinner meal.

10. A dietary formulation comprising at least three compositions, the first composition including about 90 to 280 mg of Teucrium Chamaedrys Herba, about 120 to 280 mg of Camelia Thea Folia and about 90 to 280 Spirulina Maxima; the second composition including about 300 to 600 mg of dry extract of Garcinia Cambogia Fructuse, about 110 to 280 mg dry extract of Fucus Vesicolosus and about 90 to 280 mg Teucrium Chamaedrys Herba; and the third composition including about 300 to 600 mg of dry extract of Garcinia Cambogia Fructuse, about 60 to 200 mg of dry extract of Fucus Vesicolosus and about 100 to 280 mg of dry extract of Orthosiphon Stamineus Folia.

11. A dietary formulation comprising at least four compositions, the first composition including about 90 to 280 mg of Teucrium Chamaedrys Herba, about 120 to 280 mg of Camelia Thea Folia and about 90 to 280 Spirulina Maxima; the second composition including about 300 to 600 mg of dry extract of Garcinia Cambogia Fructuse, about 110 to 280 mg dry extract of Fucus Vesicolosus, and about 90 to 280 mg Teucrium Chamaedrys Herba; and the third composition including about 300 to 600 mg of dry extract of Garcinia Cambogia Fructuse, about 60 to 200 mg of dry extract of Fucus Vesicolosus, and about 100 to 280 mg of dry extract of Orthosiphon Stamineus Folia and the fourth composition including about 140 to 550 mg of Phaseolus Vulgaris Fructus, about 50 to 250 mg of dry extract of Garcinia Cambogia Fructus, about 75 to 175 mg of dry extract of Ananas Sativus Stipites, about 50 to 130 mg of dry extract of Gymnema Sylvestre Folia and about 0.001 to 0.015 mg of Chromium Dinicotinate.

* * * * *